April 9, 1957   J. R. HOLMES ET AL   2,787,888
AIR CONDITIONING SYSTEMS
Filed Dec. 18, 1953   6 Sheets-Sheet 2

Inventors
John Ralph Holmes,
Lawrence C. Zwicker &
BY Robert R. Mandy
C. H. Dibble
Attorney April 9, 1957   J. R. HOLMES ET AL   2,787,888
AIR CONDITIONING SYSTEMS
Filed Dec. 18, 1953   6 Sheets-Sheet 3
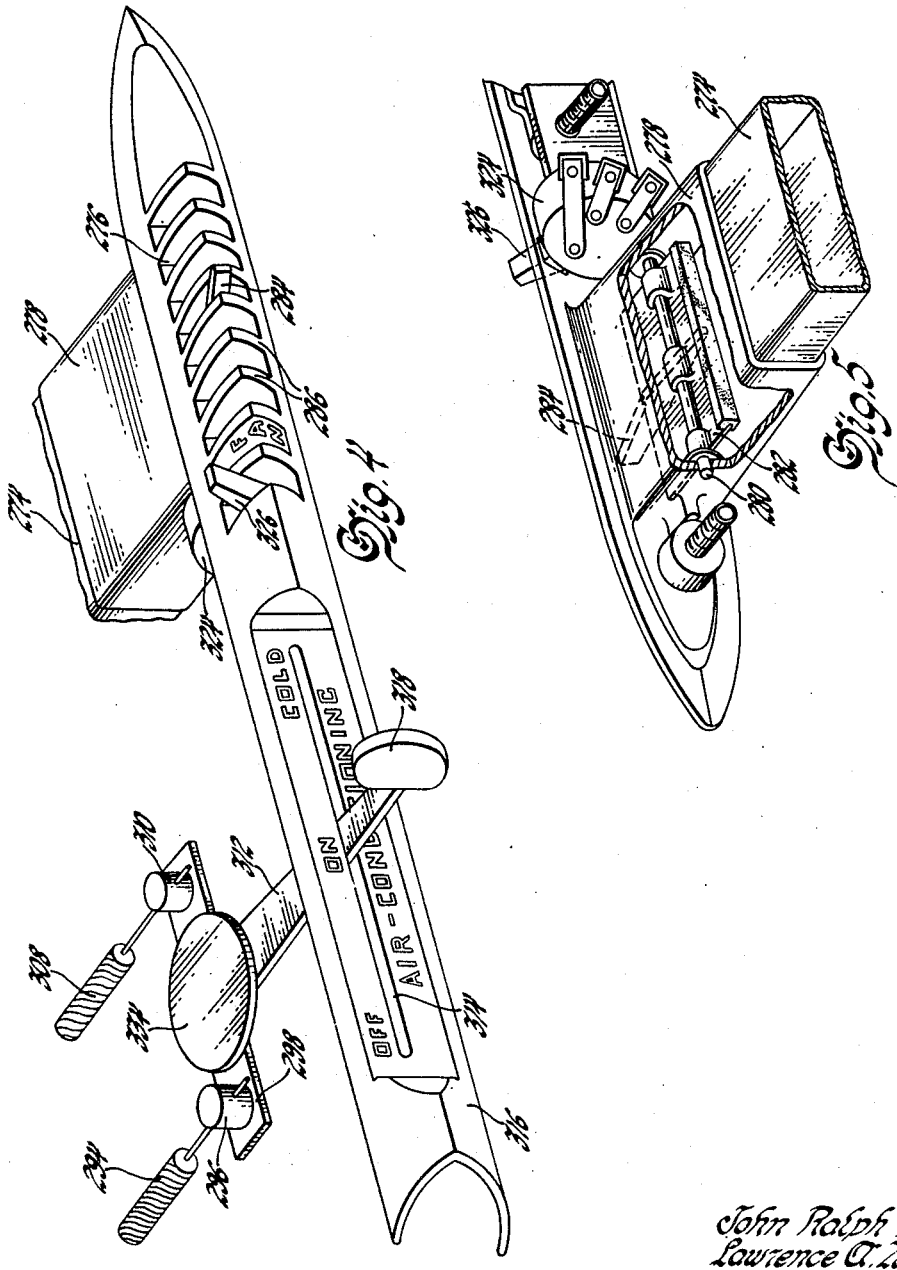
Inventors
John Ralph Holmes,
Lawrence A. Zwicker &
BY Robert R. Mandy
C. H. Dibble
Attorney Inventors
John Ralph Holmes,
Lawrence C. Zwicker &
BY Robert R. Mandy
C. H. Dilbe
Attorney

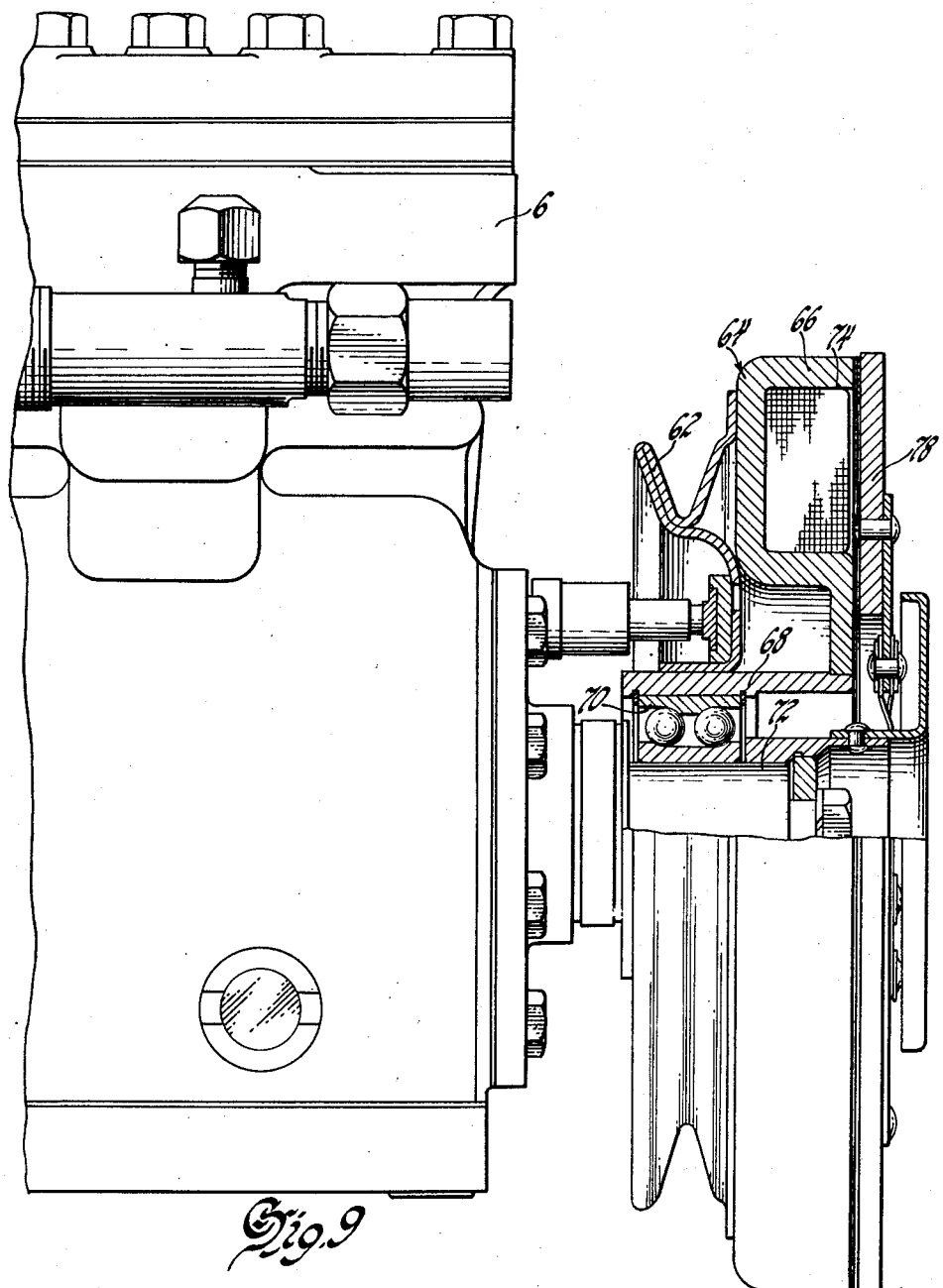

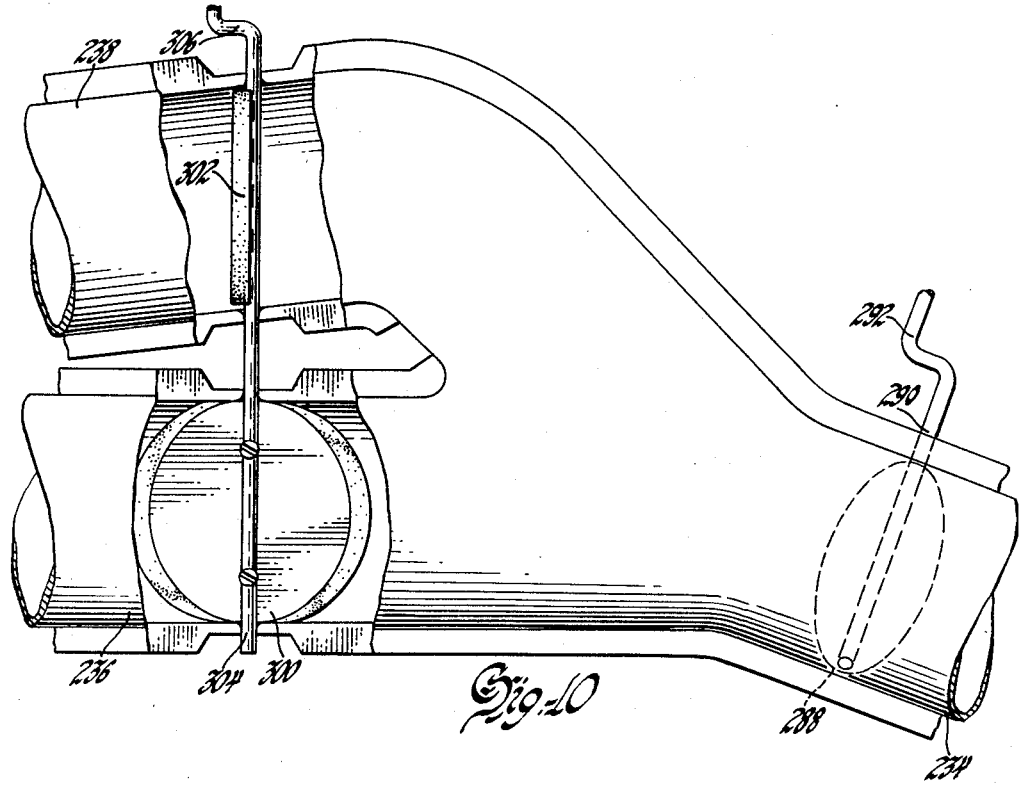
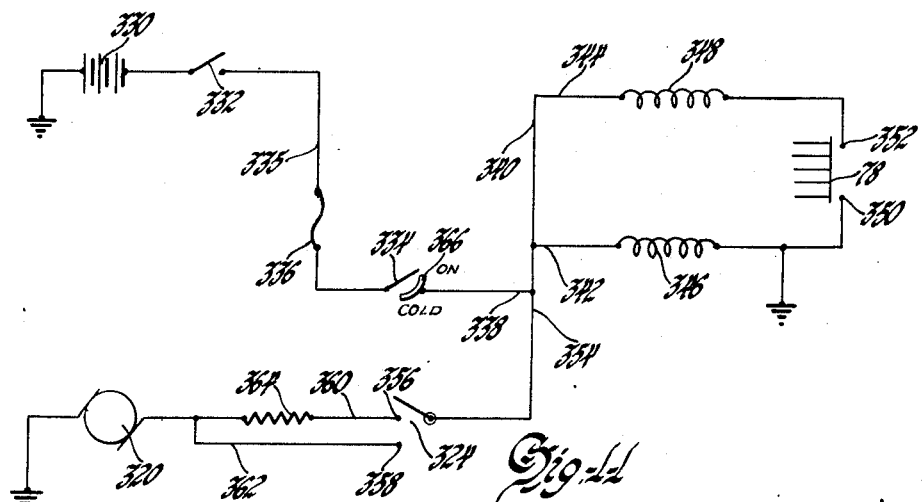

United States Patent Office 2,787,888
Patented Apr. 9, 1957

2,787,888

AIR CONDITIONING SYSTEMS

John Ralph Holmes, Lawrence A. Zwicker, and Robert R. Mandy, Lockport, N. Y., assignors to General Motors Corporation, Detroit, Mich., a corporation of Delaware Application December 18, 1953, Serial No. 399,014

3 Claims. (Cl. 62—3)

This invention relates to air conditioning systems and more particularly to air conditioning systems for use in automotive vehicles.

Air conditioning systems have been used to some extent in automotive vehicles for a number of years. Until recently, however, such systems had not been used to any great extent in automotive vehicles of the passenger type. The systems hereinbefore utilized for air conditioning of motor vehicles have been relatively expensive and cumbersome. Modern motor vehicles employ numerous accessories to improve the efficiency and comfort thereof, such, for example, as power steering apparatus, air filters, heating and ventilating equipment, etc. Such auxiliaries occupy considerable space and render it difficult to install additional auxiliary equipment such as air conditioning systems.

One object of the present invention is to provide an efficient and highly simplified air conditioning system for automotive vehicles which occupies a minimum of space.

Another object is to provide an air conditioning system wherein all of the components thereof are mounted forwardly of the instrument panel of the vehicle.

A further object is to provide an air conditioning system of the stated character, an expansion valve between the receiver and the low-pressure side of the compressor which operates to permit the refrigerant to by-pass the evaporator and flow directly to the compressor when the suction pressure of the latter decreases below a predetermined value.

A further object is to provide in a refrigerating system of the class described, an evaporator pressure regulating valve in the line between the evaporator and the compressor which operates to maintain a predetermined pressure of the refrigerant in the evaporator.

A still further object is to provide in a system of the stated character, a novel arrangement of conduits and control valves which permits the desired degree of blending of the cooled and uncooled air to assure proper temperature conditions in the vehicle.

A still further object is to provide in the system of the stated character, an evaporator construction of the flooded type which permits a relatively large quantity of refrigerant to rapidly pass through the evaporator.

Other and further objects will become apparent as the description of the invention progresses.

Of the drawings:

Fig. 4 is an enlarged perspective view of the escutcheon and grille mounted on the instrument panel showing the control lever, the center air outlet, and the grille work associated therewith.

Fig. 5 is a perspective view of the center air outlet and the blower control switch, parts of the casing being broken away to show more clearly the structure of the control valve.

Fig. 9 is an enlarged side elevational view of a portion of the compressor and the clutch means associated therewith, parts thereof being broken away and shown in section to more clearly illustrate the structure of the magnetic clutch.

Fig. 10 is a plan view of a portion of the air ducts of the system, parts being broken away to more clearly illustrate the construction and arrangement of certain of the valves, and Fig. 11 is a wiring diagram of the control circuit for the blower and the magnetic clutch associated with the system.

Figure 1:
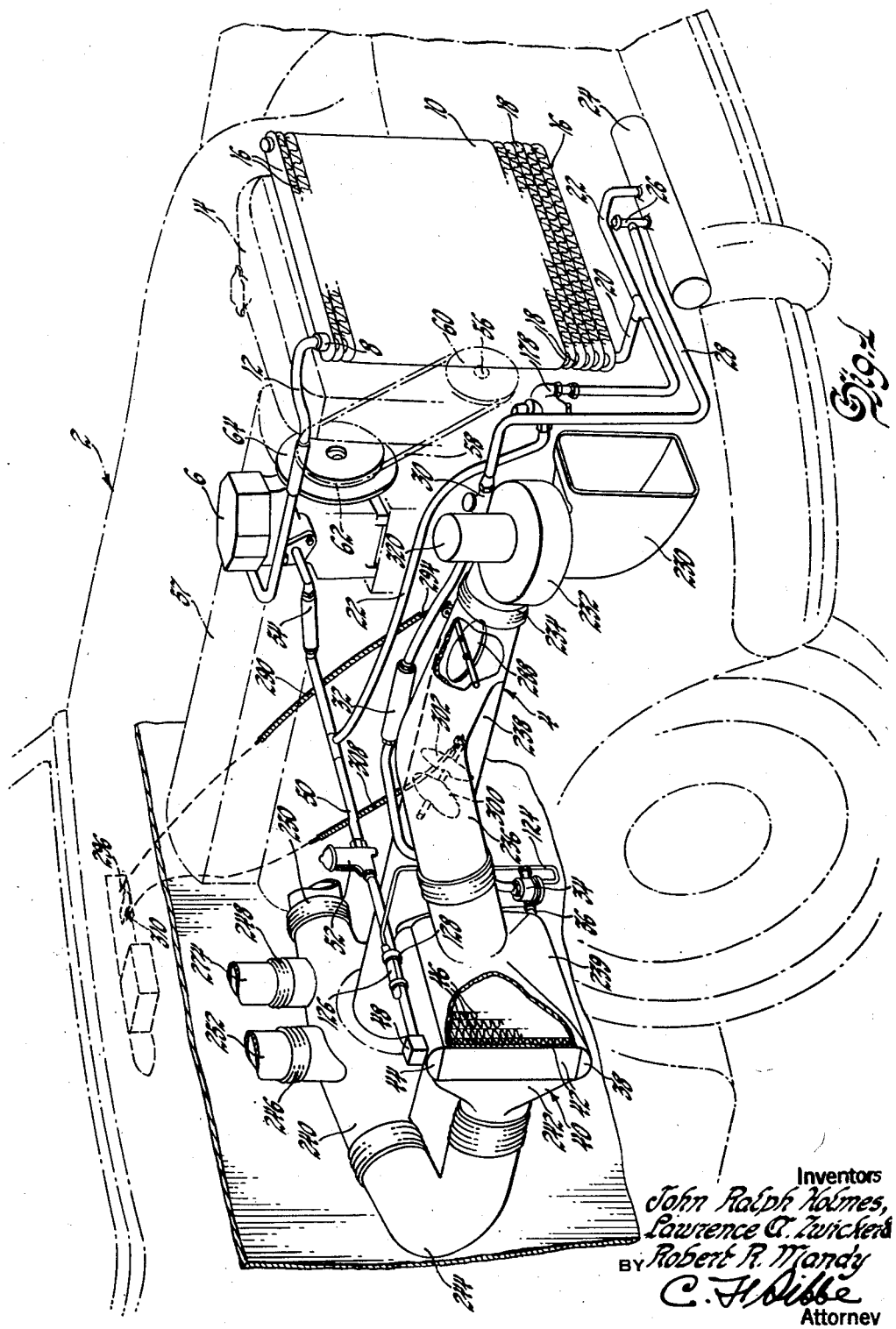
Fig. 1 is a perspective view of the front end of an automotive vehicle showing a major portion of the air conditioning system comprising the present invention.

Referring to the drawings and more particularly to Fig. 1 thereof, the numeral 2 indicates generally by broken lines the front end of an automotive vehicle having mounted therein an air conditioning system indicated generally by the numeral 4. The refrigerant circulating portion of the system comprises a compressor 6 of any suitable construction, the discharge end of which being connected to the inlet fitting 8 of a condenser 10 by a pipe connection 12. Condenser 10 is mounted forwardly of the radiator 14 of the vehicle and comprises a series of flat substantially horizontally disposed tubes 16 which are interconnected at each end by connectors 18 which in effect form a vertically disposed header at each side of the condenser. The lowermost tube 16 is connected by a branch pipe 20 to a pipe 22 connected at one end to a receiver 24. A discharge fitting 26 is secured to the receiver 24 and has connected thereto one end of a pipe 28 having mounted respectively therein an indicator for the liquid refrigerant 30, a refrigerant dehydrator 32 which may be of the wire mesh or other type and a thermostatic expansion valve 34. The discharge fitting 36 of expansion valve 34 is connected directly to the lower tank 38 of a vertical tube, flood type evaporator indicated generally at 40. The evaporator 40 comprises a series of vertically disposed, substantially parallel flat tubes 42 connected at their lower ends to the inlet tank 38 and at their upper ends to their upper or discharge tank 44. A series of fins or air centers 46 through which the air passes, as will appear more fully hereinafter, are disposed between and in intimate contact with the sides of tubes 42. Tank 44 has mounted thereon a discharge fitting 48 to which one end of a pipe 50 is connected. Pipe 50 has connected thereto an evaporator pressure regulator valve 52 and a vibration dampening means 54 of any suitable type. The other end of pipe 50 is connected to the inlet or suction side of compressor 6.

The compressor 6 is driven from a driven shaft 56 of the vehicle engine 57, shown in outline in Fig. 1, by a belt 58 which is trained over a pulley 60 mounted on said shaft and a pulley 62 disposed adjacent the magnetic clutch 64 associated with the compressor. When the air conditioning system is not in operation the clutch 64 is disconnected and the compressor will not be driven by the engine shaft. The clutch 64 comprises a member 66 secured to the pulley 62. Both the member 66 and pulley 62 are secured to a hub 68 which is mounted on ball bearings 70 mounted for rotation on the compressor shaft 72. Member 66 has an annular open recess 74 provided therein for receiving the coils 346 and 348 (Fig. 11) which, as will appear more fully hereinafter, are connected to a suitable source of current and adapted to be energized. The second element of the clutch 64 consists of an armature disc 78 which is secured by any suitable means to the compressor shaft 72. Consequently, upon energization of the coils 346 and 348, the armature 78 will be attracted thereby to couple the parts to the compressor shaft which will now be driven by the engine shaft 56 through the belt and pulley connections previously described.

Figure 8:
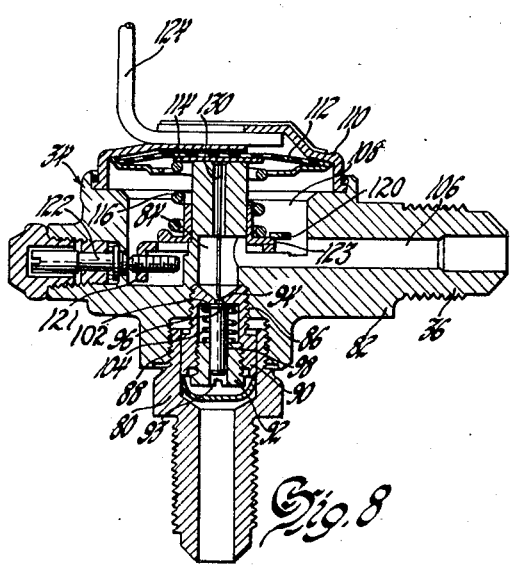
Fig. 8 is a sectional elevational view of the thermostatically controlled evaporator expansion valve.

Referring now more particularly to Figs. 1 and 8, the thermostatic expansion valve 34 comprises an inlet fitting 80 through which the high pressure refrigerant from receiver 24 enters. The fitting 80 is secured by screw threads to the body 82 having provided therein a vertically disposed passage 84 provided therein which communicates at its lower end with threaded bores 86 and 88 of varying diameters. The fitting 80 is secured to the threads of bore 88 while a second plug-like valve seating member 90 is secured to the threaded bore 86. Plug 92 has a central bore 93 therein and is secured by screw threads to the lower end of valve seating member 90. A valve 94 of the ball type is adapted to engage the lower end of valve seat 96 provided in member 90 and disposed at the lower end of passage 84. A pin 98 is loosely mounted and guided for movement in the vertical bore 93 in plug 92 and has a head or disc 102 provided at the upper end thereof on which the ball valve 94 is mounted. A coil spring 104 extends between the uppper end of plug 92 and the lower surface of disc 102 to retain the valve 94 in seated position. This valve is not further described herein as other forms of thermostatic expansion valves may be substituted without departing from the spirit of the present invention.

The body 82 of valve 34 has a passage 106 provided in the outlet fitting 36 thereof and disposed at substantially right angles to the inlet fitting 80. Passage 106 communicates with vertical passage 84 and an enlarged chamber 108 provided at the upper end of the body 82. A cap member 110 is provided at the upper end of body 82 and closes the upper end of chamber 108. A diaphragm 112 is provided in cap member 110 and extends thereacross. Diaphragm 112 has a plate or spring seat 114 secured to the lower end thereof which is engaged by the upper end of a spring 116. The lower end of spring 116 engages an adjustable spring seat 120. The spring seat 120 may be adjusted by a screw member 122 to vary the tension of spring 116 and thereby vary the degree of super-heat of the refrigerant. This adjustment conveniently may be provided by suitable cooperating cam surfaces placed on parts 121 and 123 of the valve. The upper end of cap member 110 has secured thereto one end of a capillary tube 124. Capillary tube 124 has connected to the other end thereof a bulb 126 which is secured by means of a clamp 128 to the outlet tube 50 leading from the evaporator 40. A pin 130 is secured to diaphram plate 114 and extends downwardly through the vertical passage 84 in the body 82 of valve 34 and is adapted to actuate the ball valve 94 downwardly against the tension of spring 104 to permit refrigerant to pass through the said valve to the evaporator. The spring 116 is tensioned to resist a predetermined pressure imposed by the thermostat. A thermostatic fluid, such as Freon, is retained in the capillary tube and bulb and when the temperature in the discharge pipe 50 rises above a certain value the Freon expands, thereby compressing spring 116 and unseating valve 94. In addition to spring 116 the underside of the diaphragm 112 is subjected to the pressure of the refrigerant in the chamber 108 and consequently to the pressure in the evaporator 40 which, as mentioned hereinbefore, is maintained at a predetermined value by pressure regulating valve 52. The refrigerant entering the lower tank 38 of evaporator 40 is adapted to flood the system, that is, to flow freely throughout the length of the tank 38 and then upwardly through the tubes 42 and into tank 44. A considerable quantity of refrigerant is thus permitted to expand through the evaporator and thereby produce a rapid cooling effect therein. By the use of this type of evaporator a relatively small unit might be employed.

Figure 7:
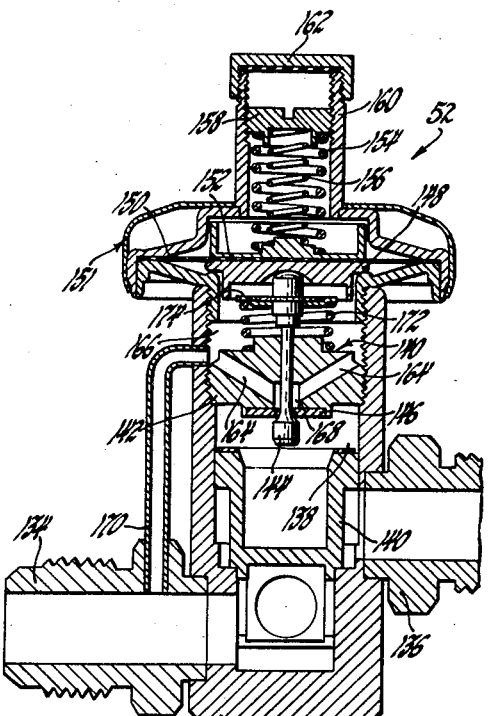
Fig. 7 is a sectional elevational view of the evaporator pressure regulator valve.

Referring more particularly to Fig. 7, the evaporator pressure regulating valve 52 comprises a central body portion 132, an inlet fitting 134, and an outlet fitting 136. The body portion is provided with a central chamber 138 having a valve member 140 mounted for vertical movement therein. A diaphragm operating valve assembly 140 is mounted in chamber 138 above valve 140 and comprises a body portion 142 which is secured in position by screw threads. A valve element 144 is mounted for reciprocating movement in a bore extending centrally of and through body member 142 and is adapted to seat against a valve seat 146 provided at the lower end of said member. The upper end of valve member 144 engages a disc member 148 secured to the lower end of a diaphragm 150 mounted in a cap member 151 secured by screw threads to the upper end of body 132. A second disc 152 engages the upper surface of diaphragm 150 and forms a spring seat for a pair of springs 154 and 156. The upper ends of springs 154 and 156 seat against an adjustable seat 158, screw threaded into the hollow interior of the upper tubular portion 160 of cap 151. A cap member 162 is provided at the upper end of tubular portion 160 to prevent entry of foreign matter into the valve. Body portion 142 has provided therein inclined passages 164 which connect the upper portion 166 of chamber 138 with an inner chamber 168 disposed immediately above valve seat 146. A tube 170 connects fitting 134 with the upper portion 166 of chamber 138. A spring 172 is disposed between the upper end of body 142 and a spring seat 174 secured to valve element 144 and operates to normally hold the latter in seated position. From the foregoing description it is seen that the evaporator pressure is communicated to the upper portion 166 of chamber 138 and with the spring 172 tends to balance the pressure on the diaphragm 150 against the pressures of springs 154 and 156. When the evaporator pressure plus the pressure of spring 172 exceeds that of the springs 154 and 156, valve 144 will remain closed. The pressure of the fluid entering fitting 134 and operating against the lower end of valve 140 now causes the latter to move upwardly thereby establishing communication between fittings 134 and 136 and permitting the flow of refrigerant to the compressor. When the pressure in the evaporator falls below a predetermined value, springs 154 and 156 will actuate valve 144 downwardly thereby causing fluid from fitting 134 to flow through passages 164 and downwardly into chamber 138 above valve 140 causing the latter to move downwardly. Both sides of valve 140, it will be observed, are now connected to the same pressure and since the effective area at the upper end of the valve is greater than that at the lower end of the valve the latter will move to seated position thereby preventing or reducing flow of refrigerant through the valve. By adjusting springs 154 and 156 the predetermined minimum evaporator pressure may be varied.

During the course of operation, it may develop that little demand is made on the system. Under such conditions the pressure at the suction side of the compressor tends to fall below the lowest predetermined value at which proper operation may be effected and if not corrected vacuum conditions may occur in the system. To prevent such conditions from taking place, an automatic expansion valve 178 is provided in pipe 22, which it will be remembered is connected at one end to the receiver 24. The other end of pipe 22 is connected to the pipe 50 leading from the evaporator to the suction or low-pressure side of compressor 6.

Figure 6:
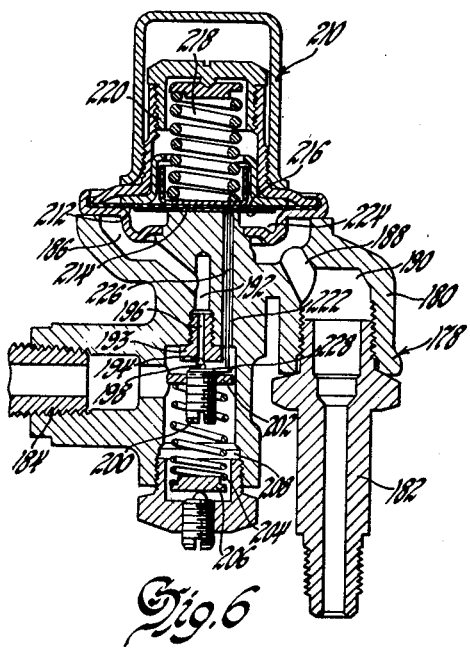
Fig. 6 is a sectional elevational view of the automatic expansion valve.

Referring particularly to Fig. 6, valve 178 comprises a central body portion 180 having an inlet fitting 182 and an outlet fitting 184. Body portion 180 has formed therein an annular irregular shaped passage 186 near the upper end thereof which communicates by means of passages 188 and inlet chamber 190 with the inlet fitting 182. Body portion 180 has a substantially vertical passage 192 which communicates with the lower end of passage 186. The enlarged lower end of passage 192 has screw threads thereon for receiving a plug 193 having a valve seat 194 at the lower end thereof. The lower end of the reduced passage 196 in plug 193 is normally closed by a valve 198 secured to the upper end of a threaded member 200 which in turn is secured to a spring seat 202. Seat 202 is engaged by a coil spring 204 which seats against an adjustable spring seat 206 at the lower end thereof. Valve 198 and spring 204 and the associated parts are mounted in a vertical chamber 208 which communicates with outlet fitting 184. The upper end of body 180 has mounted thereon a cap structure 210 having a diaphragm 212 secured therein. Diaphragm 212 has a plate member 216 secured thereto which is adapted to engage the upper flat surface 214 of the body portion 180. A spring 218 adjustable by a cap 220 tends to maintain the valve in an open position. A vertical passage 222 connects chamber 208 with the lower surface of plate 216 and fluid entering the chamber 208 is adapted to flow upwardly through the said passage 222 and enter an annular passage 224 when the diaphragm 212 is unseated. The plate 216 is connected by a rod 226 and an arm 228 to the needle valve 198. Consequently, when the diaphragm moves downwardly, valve 198 is unseated and refrigerant is then permitted to flow through fitting 182, passages 186, 192, 196, chamber 208 and fitting 184 and into the suction pipe 50 and thence to the compressor. It will also be observed that the lower surface of diaphragm 212 is directly connected to the pressure at the suction side of compressor 6. The spring 218 is so tensioned that valve 198 will remain in seated position until the suction or back-pressure in the compressor falls below a certain value. When this pressure is reached spring 218 causes diaphragm 212 to move downwardly which in turn operates valve 198 through the connections 226 and 228 thereby unseating the valve and permitting Freon from the receiver to flow into line 50 and thence to suction side of compressor 6. High pressure fluid thus enters the suction side of the compressor causing the pressure thereof to rise to the desired value. When this occurs, this pressure will be communicated to the diaphragm 212 causing the latter to move upwardly against the action of spring 218 to cause seating of valve 198. The parts will remain in this position until the pressure in line 50 again falls below the desired predetermined value, at which time the operations just described again take place. By adjusting the spring 218 the valve 198 may be conditioned to open at different predetermined pressures.

Figure 2:
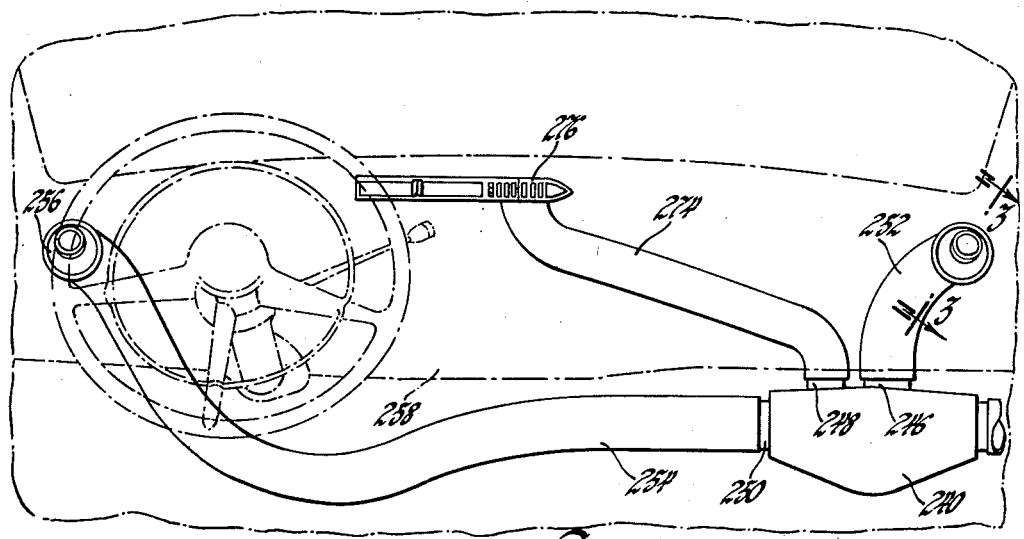
Fig. 2 is an elevational view looking toward the instrument panel from the interior of the vehicle showing the arrangement of the air outlets and the connections leading thereto.
Figure 3:
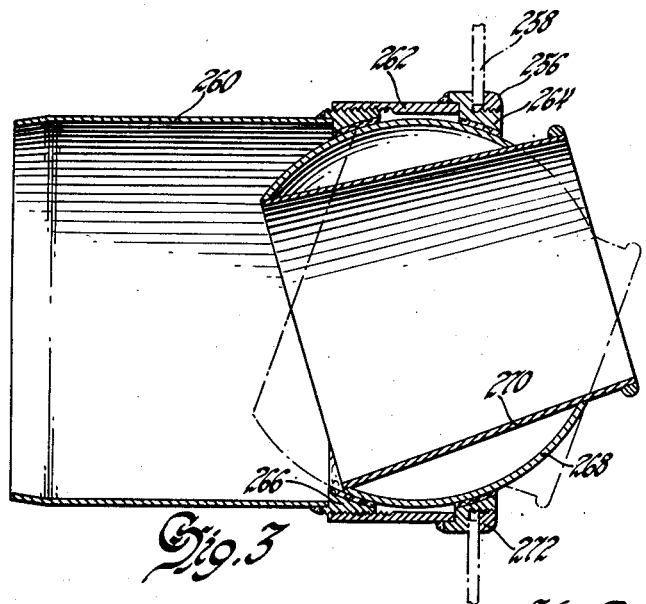
Fig. 3 is a side sectional elevational view of one of the air outlets provided at the ends of the instrument panel.

The air enters the system through an inlet duct 230 which is disposed at one side of the radiator 14 and condenser 16. The air is drawn into duct 230 upon movement of the vehicle and also by means of an induction fan 232. The air discharging from fan 232 enters a duct 234 (Figs. 1 and 10) having branch ducts 236 and 238 connected thereto. Branch duct 236 is connected to the inlet side of casing 239 of evaporator 40 while branch duct 238 is connected directly to an air distributor casing 240. The discharge side 242 of the casing 239 is connected by an elbow duct 244 with one end of distributor casing 240. Distributor casing 240 has three outlet fittings 246, 248 and 250, respectively, connected thereto. Fittings 246 and 250 are connected by flexible hose connections 252 and 254 (Fig. 2) with adjustable air directing members 256 mounted near the opposite ends of the instrument panel 258 of the vehicle. Each of the air directing members 256 are of identical construction and shown in detail in Fig. 3. Each outlet 256 comprises a tubular air inlet portion 260 which is secured to a tubular bearing member 262 near the discharge end thereof. Bearing portion is provided with spaced arcuate bearings 264 and 266 for receiving an adjustable spherical member 268 having a tubular element 270 secured to and extending therethrough. The bearing portion 262 may be secured to the instrument panel 258 in any suitable manner as by the annular clamp ring 272, as shown in Fig. 3. From this construction it is seen that by manipulating the element 270 the ball portion may be moved on its bearing to any desired position to direct the air in different paths into the passenger compartment.

Fitting 248 of distributor casing 240 is connected by a flexible hose connection 274 with the central air outlet 276 also mounted on the instrument panel 258. As shown more clearly in Figs. 2, 4 and 5, hose connection 274 is secured at the other end thereof in any suitable manner to the substantially rectangular inlet duct 278 of center air directing member 276. Duct 278 has mounted on a shaft 280 journalled in the side walls thereof a flat plate-like valve member 282. An operating handle 284 is secured to valve 282 and extends through the grille 286 for ready actuation by the operator. By manipulating the lever 284, valve 282 may be moved up or down or may remain in an intermediate position so that the air may be correspondingly directed to the interior of the vehicle.

Duct 234, as shown in Figs. 1 and 10, has provided therein a valve 288 mounted on a shaft 290 having a crank portion 292 secured to one end thereof. Crank 292 has connected thereto one end of the Bowden cable 294, the other end of which is connected to a clamp member 296 provided at one end of a lever 298. Ducts 236 and 238 also have mounted respectively therein valves 300 and 302. Valves 300 and 302 are mounted on a shaft 304 journalled in any suitable manner in the side walls of the ducts and has a crank 306 provided at one end thereof to which one end of a second Bowden cable 308 is secured. The other end of Bowden cable 308 is secured to a clamp member 310 secured to the opposite end of lever 298. Lever 298 has secured thereto an operating lever 312 which extends through a slot 314 provided in an escutcheon plate 316 secured to the instrument panel. Lever 312 is provided with a handle or finger grip 318 at the outer end thereof to facilitate movement thereof. Valves 300 and 302 are so arranged that when one is closed the other is open. These valves and valve 288 are so operated by levers 312 and 298 that when the lever is in the Off position, the main damper 288 is closed, thereby preventing air flow through the system. When lever 312 is moved to the On position the main damper 288 is wide open, damper 300 is closed and damper 302 is open thereby permitting uncooled air to flow directly to the distributor casing 240. When the lever 312 is moved to the Cold position, main damper 288 remains open, damper 300 is opened, while damper 302 is closed thereby causing all of the air entering the system to flow through the evaporator 40 before discharging into distributor casing 240. When lever 312 is in a position between On and Cold, the valve 288 remains open while dampers 300 and 302 are partially open, thereby permitting both cooled and uncooled air to flow into the distributor casing 240. A lever mechanism such as levers 312 and 298 for causing operation of valves in the sequential order first described is disclosed in copending application of George R. Bayley, Serial No. 391,425, filed November 12, 1953, and to which reference may be had for a complete disclosure thereof. Fan 232 is driven by means of an electric motor 320 which is connected into the vehicle electric system and controlled by a switch indicated at 324 in Figs. 4 and 5. Switch 324 is mounted for rotation at one side of duct 278 and has an operating lever 326 extending through the grille-work 286. The magnetic clutch 64 is also operatively connected to the vehicle electric circuit by suitable switch means associated with lever 312.

Fig. 11 is a wiring diagram of the circuit to the motor 320 and to the magnetic clutch 64 which receives its power from a battery 330 connected at one end to ground and at the other end to an ignition switch 332. Switch 332 is connected to a master switch 334 which controls the air conditioning system by a conductor 335, a fuse 336 being connected in this line. Switch 334 is connected by a conductor 338 to conductor 340 having branch conductors 342 and 344 connected thereto. Conductors 342 and 344 have "hold-in" coil 346, "pull-in" coil 348, respectively, connected therein. Conductors 342 and 344 terminate in contacts 350 and 352, respectively. The armature 78 is indicated diagrammatically opposite contacts 350 and 352. Conductor 342 is also connected to ground at a point between coil 346 and pole 350. A conductor 354 connects conductor 338 with fan or blower motor control switch 324. Switch 324 is adjustable to three positions, it being shown in the Off position and when actuated is adapted to engage contact 356 or 358. Contacts 356 and 358 are connected to conductors 360 and 362, respectively, conductor 362 being connected directly to motor 320 which in turn is connected to ground, while conductor 360 has a resistance 364 connected therein. Consequently, when switch 324 is moved to the first position or into engagement with contact 356, the motor 320 because of resistance 364 is caused to rotate at a relatively slow speed. When switch 324 is moved into engagement with contact 358 the resistance 364 is cut out and consequently the motor rotates at a higher speed.

The movable blade of switch 334 is actuated by lever 312 and is adapted to engage an extended contact 366. Consequently, when the lever is moved to the On position indicated by the legends in Fig. 4, switch 334 is closed thereby causing energization of the magnetic clutch 64. When the lever is moved to the Cold position, switch 334 remains closed and consequently the magnetic clutch remains energized.

From the foregoing description the operation of the improved air conditioning system is believed to be apparent. However, to correlate the elements thereof, a brief résumé of the operation of the device will be given. When the control lever 312 is in the Off position, switch 334 is open and compressor clutch 64 is de-energized and thus the compressor 6 as well as the air conditioning system is inoperative. Upon movement of lever 312 to the On position as viewed in Fig. 4, switch 334 is closed, thereby causing energization of the magnetic clutch 64 and operation of the compressor by the engine shaft through the belt and pulley connections takes place. At the same time, main valve 288 is moved to Open position and valve 302 is also opened causing the air now to flow through duct 230, duct 234, branch duct 236 and directly into the distributing casing 240 from which it is distributed to the air outlets 256 and 276. If the car is in motion there will be a natural circulation of air through the system. However, if it is desired to increase the air circulation, blower motor switch 324 is closed thus causing the blower 232 to induce air circulation through the system. If it now is desired to cool the air, the lever 312 is moved to Cold position. By this action valve 288 remains open while valve 302 is closed and valve 300 is opened thereby causing all of the air to flow through the evaporator 40 and thence to the distributing casing 240 from which it is distributed to the air directing elements 256 and 276. If it is desired now to increase the air temperature, the operator may move the lever to an intermediate position between the On and Cold legends shown in Fig. 4 thereby causing a portion of the air to flow through both of the branch ducts 236 and 238. By tempering the air in this manner, the desired temperature of the air discharging into the vehicle may be obtained.

From the foregoing description it is seen that a simplified and highly efficient air conditioning system has been provided. While but a single embodiment of the invention has been shown and described, the device may be embodied in other forms without departing from the invention. It therefore is to be understood that the invention is to be limited only by the scope of the claims which follow.

A feature of the invention, as has been pointed out hereinbefore, is to mount all of the elements at the forward end of the vehicle. As shown in Fig. 1, all of the elements of the air conditioning apparatus with the exception of the air directing means 256 and 276 and valves, switches, and central means associated therewith as well as portions of the ducts leading thereto are mounted forwardly of the dash or fire wall 400 of the vehicle.

What is claimed is:

1. An automotive vehicle having an engine compartment and a passenger compartment, an instrument panel mounted at the forward end of said passenger compartment, an air conditioning apparatus mounted in said engine compartment comprising a refrigerant circulating unit including a compressor, a condenser operatively connected to said compressor, a receiver operatively connected to said condenser for receiving the refrigerant discharging therefrom, an evaporator, conduit means connecting said receiver to the inlet side of said evaporator, adjustable expansion valve means in said conduit means for controlling the flow of refrigerant to said evaporator, a second conduit means connecting the outlet end of said evaporator to said compressor, a valve in said second conduit means for controlling the minimum pressure of the refrigerant in said evaporator, by-pass conduit means connecting said receiver to said second-mentioned conduit means, and valve means provided in said by-pass conduit means for automatically causing refrigerant to by-pass said evaporator and to flow to said compressor when the pressure in said second conduit means reaches a predetermined value, air duct means, means mounting said evaporator in said air duct means, an air distributor operatively connected to said air duct means, adjustable air directing means mounted at different locations on said instrument panel, and means connecting each of said last-mentioned means with said air distributing means.

2. An automotive refrigerating system comprising a compressor, a condenser connected to receive refrigerant from said compressor, a receiver operatively connected to said condenser for receiving the refrigerant discharging from the latter, an evaporator of the flooded type comprising a lower tank having a refrigerant inlet connected thereto, an upper tank having a refrigerant outlet connected thereto, a plurality of tubes connecting said tanks, fin means disposed in intimate contact with said tubes through which air may pass, conduit means connecting said receiver to said evaporator, adjustable expansion valve means in said conduit for controlling the flow of refrigerant to said evaporator, a second conduit means for connecting the outlet of said evaporator to said compressor, an adjustable regulating valve in said second conduit means for controlling the minimum pressure of the refrigerant in said evaporator, and valve controlled means connecting said receiver directly to the suction side of said compressor.

3. An automotive refrigerating system comprising a compressor, a condenser connected to receive refrigerant from said compressor, a receiver operatively connected to said condenser for receiving the refrigerant discharging from the latter, an evaporator of the flooded type comprising a lower tank having a refrigerant inlet connected thereto, an upper tank having a refrigerant outlet connected thereto, a plurality of tubes connecting said tanks, fin means disposed in intimate contact with said tubes through which air may pass, a conduit connecting said receiver to said evaporator, adjustable expansion valve means in said conduit for controlling the flow of refrigerant to said evaporator, a second conduit for connecting the outlet of said evaporator to said compressor, an adjustable regulating valve in said second conduit for controlling the pressure of the refrigerant in said evaporator, a third conduit operatively connecting said receiver to said second conduit on the compressor side of said regulating valve, and adjustable expansion valve means in said third conduit for causing the refrigerant to by-pass said evaporator when the pressure of the refrigerant entering said compressor from said evaporator reaches a predetermined minimum value.

References Cited in the file of this patent

UNITED STATES PATENTS

| | | |
|---|---|---|
| 1,858,517 | Marshall | May 17, 1932 |
| 2,045,657 | Karmazin | June 30, 1936 |
| 2,080,288 | McCormack | May 11, 1937 |
| 2,185,022 | Candor | Dec. 26, 1939 |
| 2,264,821 | Zukoski | Dec. 2, 1941 |
| 2,311,622 | Alexander et al. | Feb. 23, 1943 |
| 2,342,872 | Le Fevre et al. | Feb. 29, 1944 |
| 2,569,009 | Kuempel | Sept. 25, 1951 |
| 2,579,439 | Noe | Dec. 18, 1951 |
| 2,626,506 | Dickieson | Jan. 27, 1953 |
| 2,645,884 | Kellie | July 21, 1953 |
| 2,667,045 | McCarty | Jan. 26, 1954 |
| 2,734,346 | Dickieson | Feb. 14, 1956 |